(12) United States Patent
Wielenberg (10) Patent No.: US 11,326,323 B2
(45) Date of Patent: May 10, 2022

(54) DIRT CONTOURING AND GRADING DEVICE

(71) Applicant: Bernard E. Wielenberg, Grey Eagle, MN (US)

(72) Inventor: Bernard E. Wielenberg, Grey Eagle, MN (US)

(*) Notice: Subject to any disclaimer, the term of this patent is extended or adjusted under 35 U.S.C. 154(b) by 200 days.

(21) Appl. No.: 16/787,751

(22) Filed: Feb. 11, 2020

(65) Prior Publication Data

US 2021/0246628 A1 Aug. 12, 2021

(51) Int. Cl.
*E02F 3/78* (2006.01)
*E02F 3/84* (2006.01)

(52) U.S. Cl.
CPC .............. *E02F 3/783* (2013.01); *E02F 3/844* (2013.01)

(58) Field of Classification Search
CPC .................................. E02F 3/844; E02F 3/783
See application file for complete search history.

(56) References Cited

U.S. PATENT DOCUMENTS

| | | | | |
|---|---|---|---|---|
| 1,790,758 A * | 2/1931 | Montano et al. | ..... | E01C 23/088 299/39.8 |
| 1,818,887 A * | 8/1931 | Fairley | ................ | E01C 23/127 37/386 |
| 2,197,549 A * | 4/1940 | Hargrave | ................. | E01H 5/12 299/25 |
| 3,136,078 A * | 6/1964 | Renault | ................ | E01C 23/127 172/547 |
| 3,315,381 A * | 4/1967 | Fisher | ..................... | E01H 5/092 37/259 |
| 3,693,722 A * | 9/1972 | Brown | ..................... | E02F 3/783 172/4.5 |
| 4,878,713 A | 11/1989 | Zanetis | | |
| 5,562,398 A * | 10/1996 | Knutson | ................. | E02F 3/3677 414/732 |
| 6,068,065 A * | 5/2000 | Mehew | ................. | A01B 29/06 172/171 |
| 6,116,699 A * | 9/2000 | Kaczmarski | .......... | E01C 23/088 299/39.5 |
| 7,604,069 B1 * | 10/2009 | Kobayashi | ............. | A01B 21/08 172/272 |
| 9,328,467 B2 * | 5/2016 | Forster | ................. | E01C 23/088 |
| 9,394,669 B2 | 7/2016 | Lewis | | |
| 2010/0098521 A1 | 4/2010 | Kartal | | |
| 2014/0147207 A1* | 5/2014 | Parsons, Jr. | ........... | E01C 23/088 404/91 |

FOREIGN PATENT DOCUMENTS

| | | |
|---|---|---|
| CA | 2739073 | 4/2010 |
| GB | 2225801 | 6/1990 |

* cited by examiner

*Primary Examiner* — Jessica H Lutz (57) ABSTRACT

A dirt contouring and grading device final grading of a soil bed prior to sodding includes a vehicle, which in turn comprises a frame, a plurality of wheels, and a propulsion unit so that the vehicle is self-propelled. A deck that is engaged to the frame has a drum engaged thereto. The drum is operationally coupled to an actuator that is powered to selectively effect axial rotation of the drum against a surface upon which the vehicle is positioned. A first biaser is powered to selectively raise, lower, and angle the deck relative to the frame to create flat sections, gentle hills, and mounds in a soil bed. A second biaser is powered to selectively effect longitudinal rotation of the drum relative to the deck to direct excess soil selectively to one side or the other of the vehicle.

13 Claims, 7 Drawing Sheets

DIRT CONTOURING AND GRADING DEVICE

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to grading devices and more particularly pertains to a new grading device final grading of a soil bed prior to sodding.

(2) Description of Related Art Including Information Disclosed Under 37 CFR 1.97 and 1.98

The prior art relates to grading devices for preparing a soil bed for sodding. Prior art devices generally comprise a blade that is attached to a machine such that movement of the blade across a surface renders it substantially flat and level. The prior art devices lack a roller that is selectively controllable on three axes, which would allow a user to easily contour gentle hills and mounds, as well as to direct excess soil selectively to one side or the other of the machine.

BRIEF SUMMARY OF THE INVENTION

An embodiment of the disclosure meets the needs presented above by generally comprising a vehicle, which in turn comprises a frame, a plurality of wheels, and a propulsion unit so that the vehicle is self-propelled. A deck that is engaged to the frame has a drum engaged thereto. The drum is operationally coupled to an actuator that is powered to selectively effect axial rotation of the drum against a surface upon which the vehicle is positioned. A first biaser is engaged to the frame and operationally coupled to the deck. The first biaser is powered to selectively raise, lower, and angle the deck relative to the frame to create flat sections, gentle hills, and mounds in a soil bed. A second biaser that is operationally coupled to the drum is powered to selectively effect longitudinal rotation of the drum relative to the deck to direct excess soil selectively to one side or the other of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new grading device embodying the principles and concepts of an embodiment of the disclosure and generally designated by the reference numeral 10 will be described.

As best illustrated in FIGS. 1 through 7, the dirt contouring and grading device 10 generally comprises a vehicle 12, which in turn comprises a frame 14, a plurality of wheels 16, and a propulsion unit 18 so that the vehicle 12 is self-propelled. The frame 14 comprises a rear section 20 that has a rear axle 22 coupled thereto. The rear axle 22 has opposed endpoints 24, each of which has a wheel 16 rotationally coupled thereto. A front section 26 of the frame 14 is coupled to the rear section 20. The front section 26 comprises a first segment 28, a second segment 30, and a third segment 32.

Figure 1:
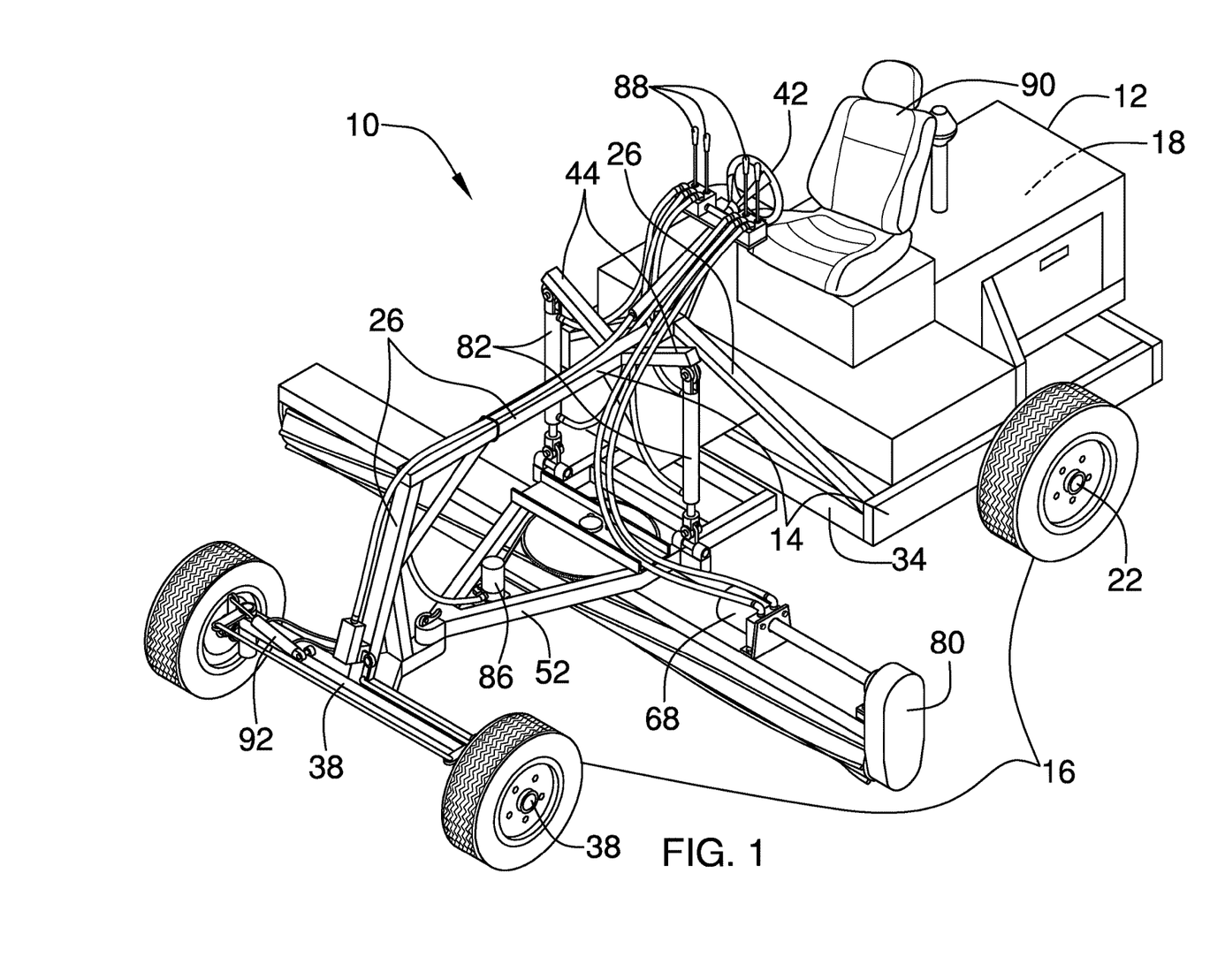
FIG. 1 is an isometric perspective view of a dirt contouring and grading device according to an embodiment of the disclosure.
Figure 2:
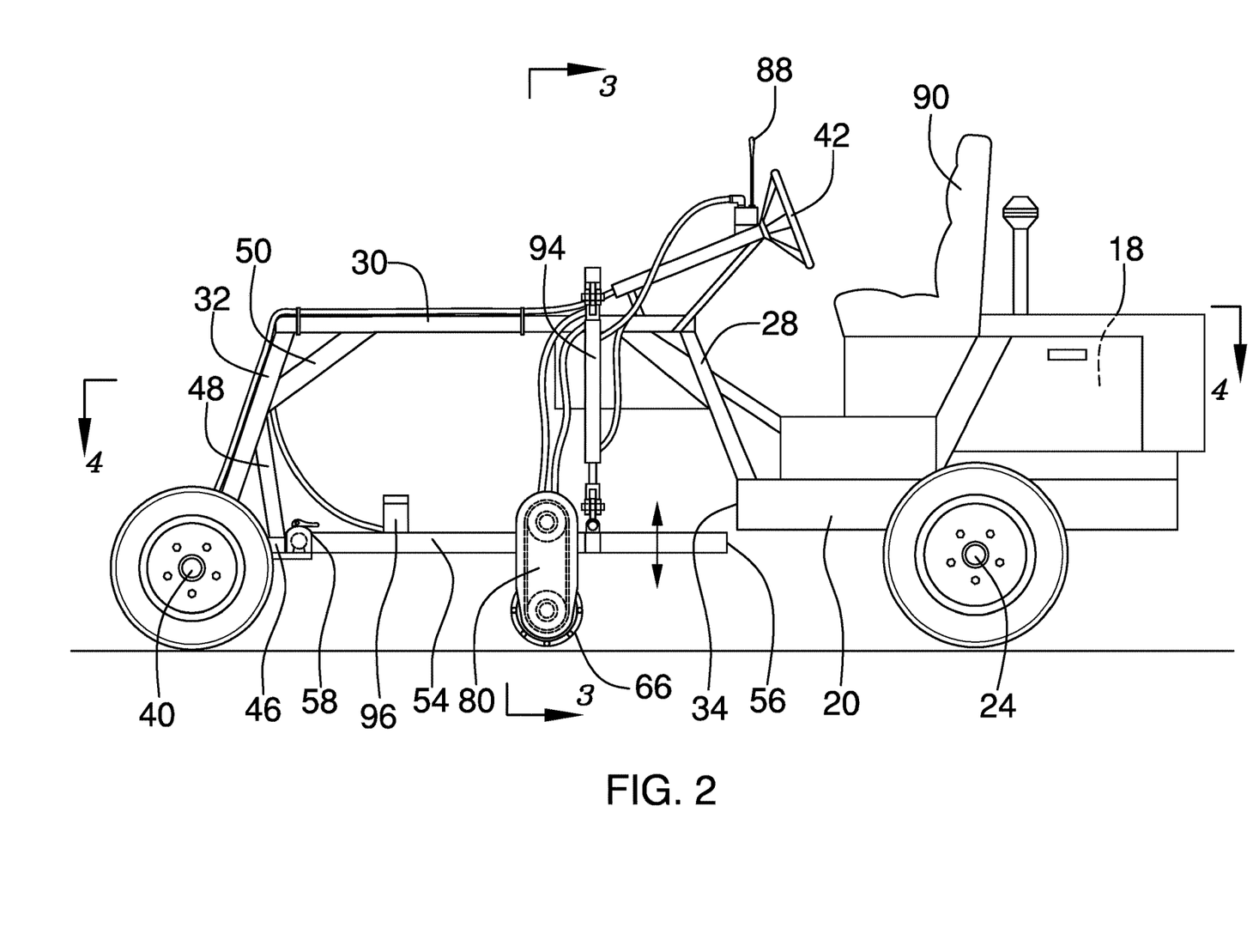
FIG. 2 is a side view of an embodiment of the disclosure.

The first segment 28 is coupled to and extends transversely and upwardly from a forward end 34 of the rear section 20, as shown in FIG. 2. The first segment 28 may be inverted V-shaped, as shown in FIG. 1, or other shape providing structural stability, such as open rectangular, open trapezoidal, and the like. The second segment 30 is coupled to and extends from the first segment 28 distal from the rear section 20 so that the second segment 30 is substantially parallel to a plane 36 that is defined by the plurality of wheels 16. The third segment 32 is coupled to and extends transversely and downwardly from the second segment 30 distal from the first segment 28. The third segment 32 has a front axle 38 coupled thereto distal from the second segment 30. The front axle 38 has opposed termini 40, each of which has a wheel 16 rotationally coupled thereto. The front axle 38 is operationally coupled to a steering unit 42 of the vehicle 12. The wheels 16 coupled to the front axle 38 also may be selectively pivotable relative to the front axle 38 by means of a tilt biaser 92, which engaged to the front axle 38. Selectively tilting the wheels 16 relative to the front axle 38 enables a smaller turning radius for the dirt contouring and grading device 10. The tilt biaser 92 may comprise a biasing hydraulic cylinder 98. The present invention also anticipates the rear axle 22 being operationally coupled to the steering unit 42.

Figure 3:
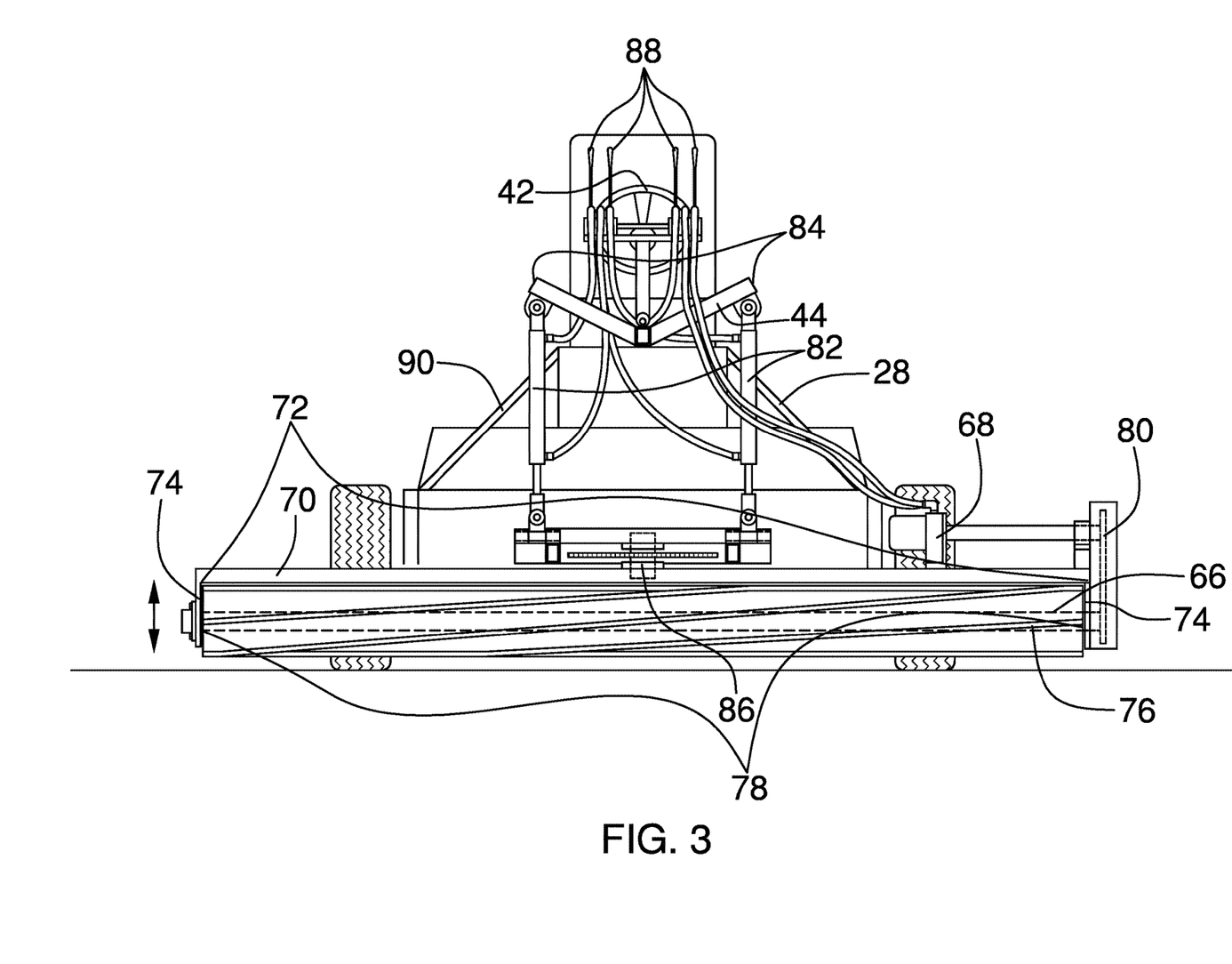
FIG. 3 is a front view of an embodiment of the disclosure.

A crossmember 44 is coupled to and extends bilaterally from the second segment 30 proximate to the first segment 28. The crossmember 44 may be V-shaped, as shown in FIG. 3. The present invention also anticipates the crossmember 44 extending linearly and bilaterally from the first segment 28.

A plate 46 is coupled to the third segment 32 proximate to the front axle 38 and extending toward the rear section 20. The plate 46 is substantially parallel to the plane 36 that is defined by the plurality of wheels 16. A first brace 48 is coupled to and extends between the plate 46 and the third segment 32. A second brace 50 is coupled to and extends between the second segment 30 and the third segment 32. The first brace 48 and the second brace 50 rigidify the front section 26 of the frame 14.

A deck 52 that is engaged to the frame 14 comprises a framework 54 having a rear end 56 and a front end 58. The rear end 56 is positioned proximate to the forward end 34 of the rear section 20 of the frame 14. The front end 58 is pivotally coupled to the plate 46 so that the rear end 56 can be raised relative to the front end 58 and so that the framework 54 can tilt relative to the plane 36. The coupling of the front end 58 to the plate 46 can be accomplished using ball-hitch type connectors or other type of connectors, such as dual hinging connectors.

The framework 54 has opposing sides 60 having a crossbar 62 coupled thereto and extending therebetween. The opposing sides 60 also have a cross support 64 coupled thereto and extending therebetween. The cross support 64 is positioned between the crossbar 62 and the rear end 56 to rigidify the framework 54.

A drum 66 that is engaged to the deck 52 is operationally coupled to an actuator 68 that is powered to selectively effect axial rotation of the drum 66 against a surface, such as a soil bed, upon which the vehicle 12 is positioned. The actuator 68 may comprise a first hydraulic motor 100, or other type of motor, such as, but not limited to, pneumatic, electric, and the like. The wheels 16 on the front axle 38 can be tilted to provide a counter force to that imparted to the frame 14 by action of the drum 66 rotating against the surface.

Figure 5:
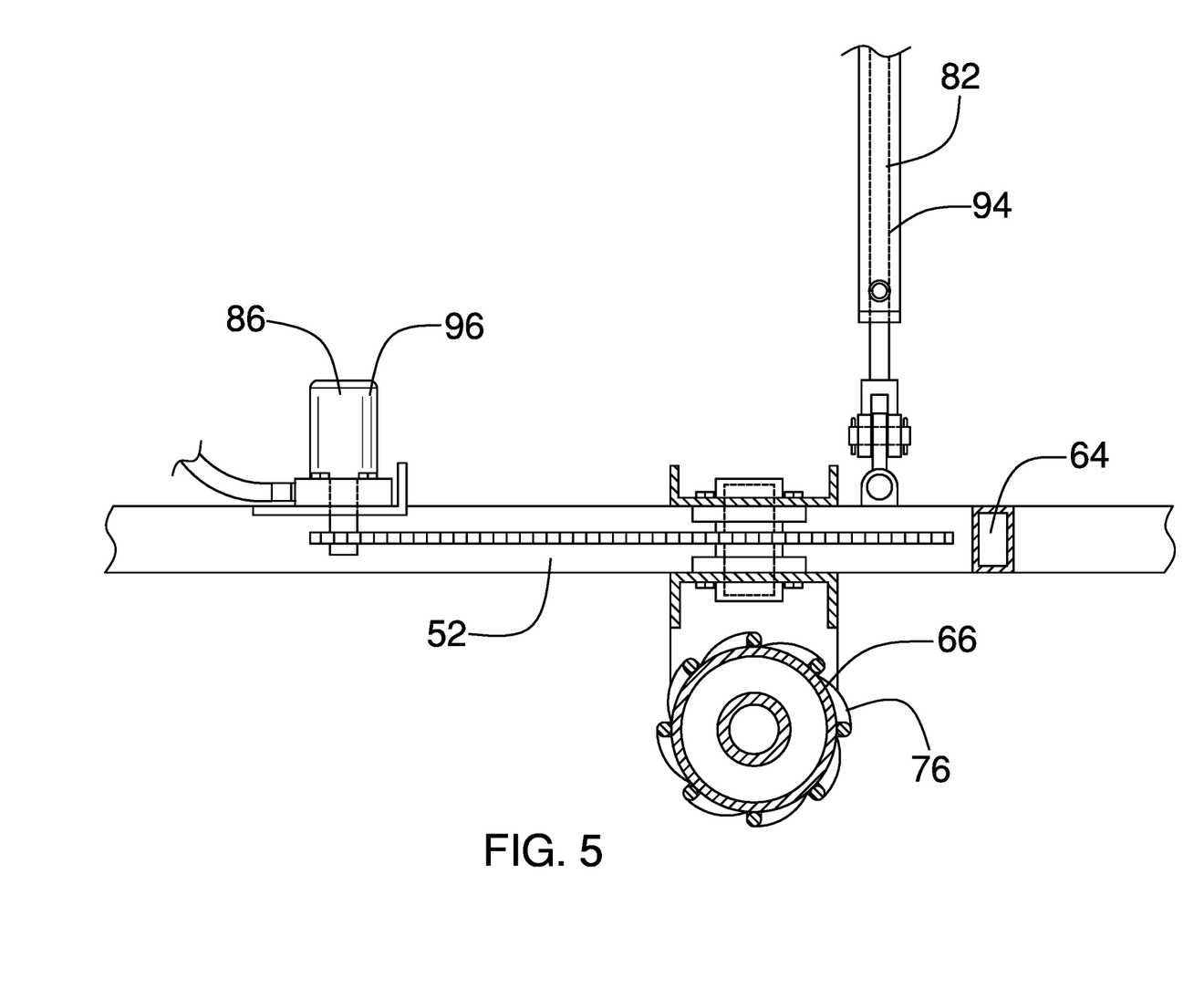
FIG. 5 is a detail view of an embodiment of the disclosure.
Figure 6:
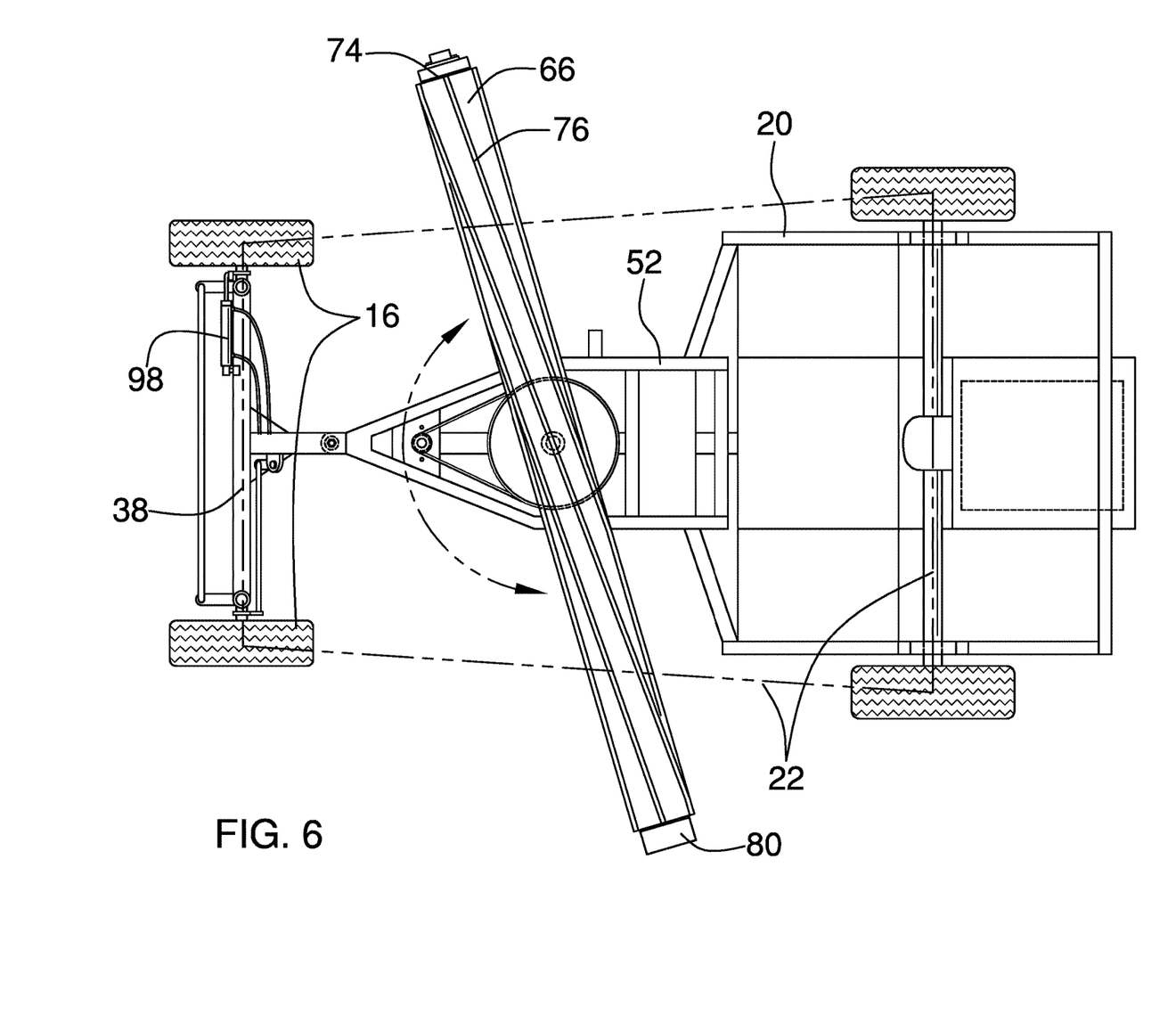
FIG. 6 is a bottom view of an embodiment of the disclosure.
Figure 7:
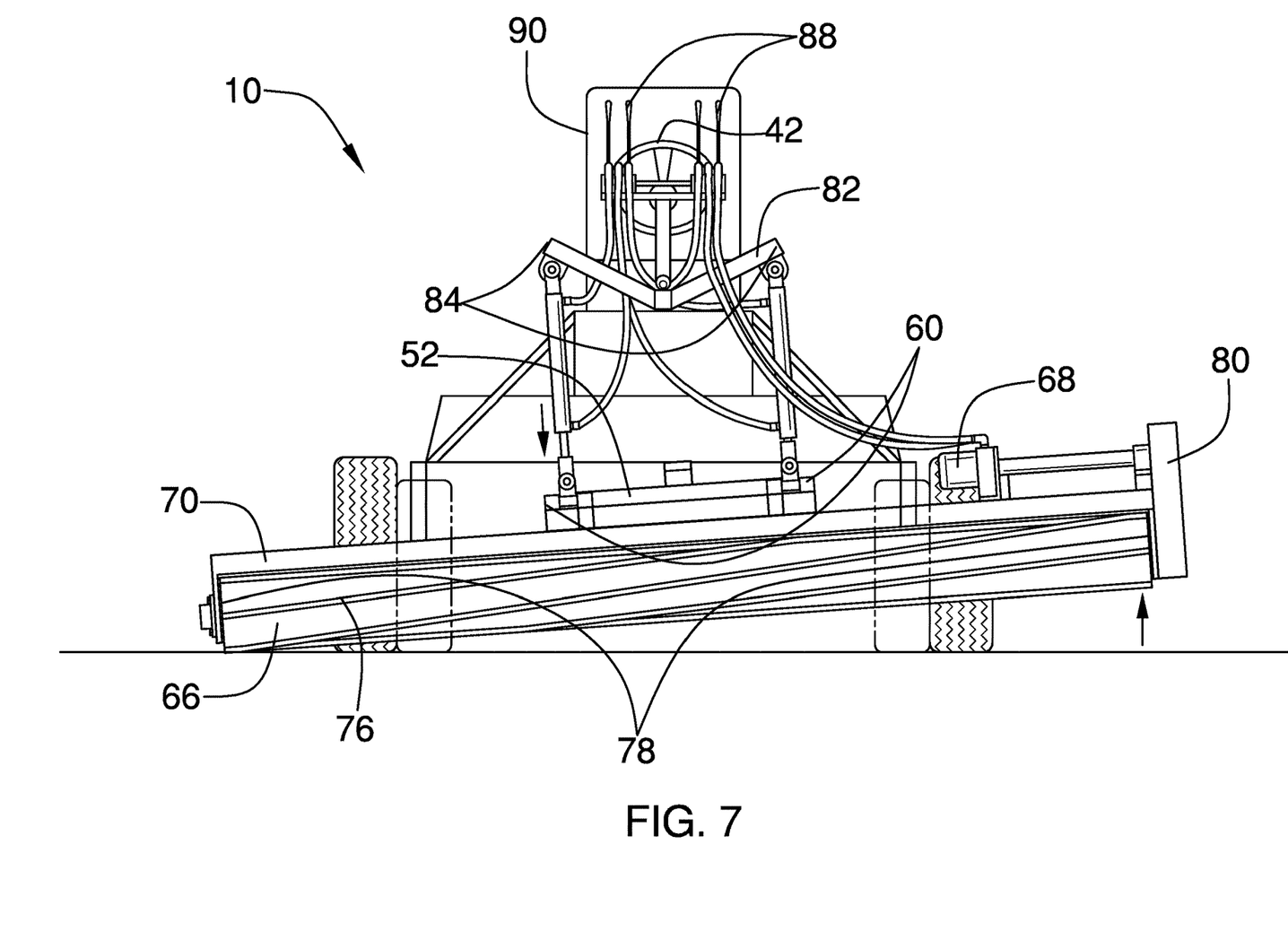
FIG. 7 is a truncated front view of an embodiment of the disclosure.

A beam 70 that is engaged to the crossbar 62 has opposed ends 72. Each opposed end 72 has an endplate 74 coupled thereto and extending perpendicularly therefrom. The drum 66 is rotationally coupled to and extends between the endplates 74. Thus positioned, the drum 66 is open when viewed from the front axle 38 and the rear axle 22. As will become apparent, this configuration allows the drum 66 to contact raised portions of the soil bed as the vehicle 12 rolls across the surface, and to selectively dispense soil to the rear of the drum 66. A protrusion 76 that is coupled to and which extends from the drum 66, as shown in FIG. 5, grates the surface as the vehicle 12 rolls across the surface. The protrusion 76 is elongated and extends curvedly between opposing limits 78 of the drum 66.

A gearbox 80 is engaged to a respective endplate 74 and is operationally coupled to the actuator 68 and the drum 66. The gearbox 80 is positioned to provide speed and torque conversion between the actuator 68 and the drum 66.

A first biaser 82 is engaged to the frame 14 and operationally coupled to the deck 52. The first biaser 82 is powered to selectively raise, lower, and angle the deck 52 relative to the frame 14 to create flat sections, gentle hills, and mounds in the soil bed. The first biaser 82 may comprise a first hydraulic cylinder 94, as shown in FIG. 3. The first biaser 82 also maybe other biaser type, such as, but not limited to, pulley type, rack and pinion type, and the like. The first biaser 82 may be one of a pair of first biasers 82, with each first biaser 82 being pivotally coupled to and extending between a respective opposing limit 84 of the crossmember 44 and an associated opposing side 60 of the framework 54. Having two first biasers 82 versus a single first biaser 82 provides greater stability to the deck 52.

Figure 4:
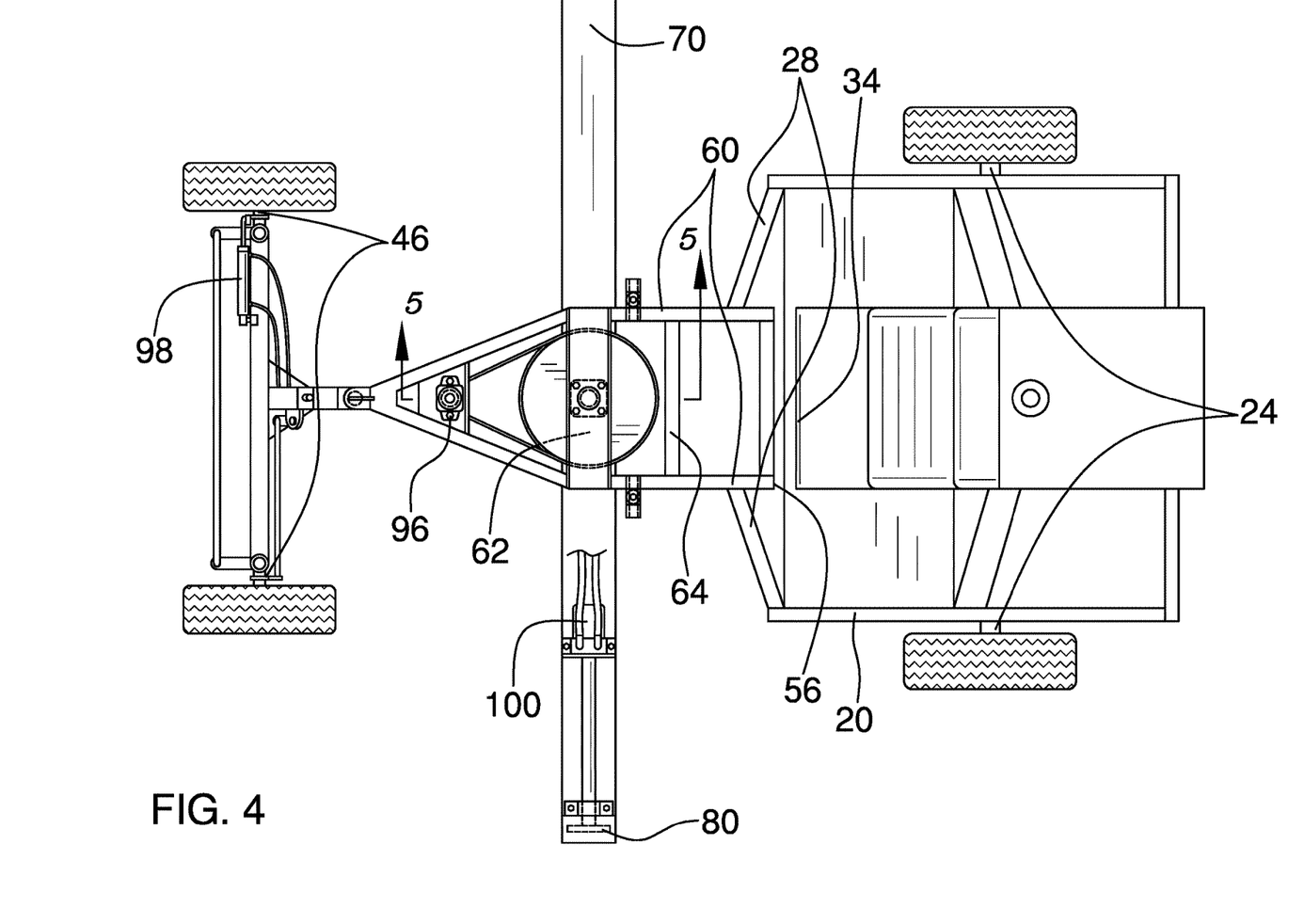
FIG. 4 is a top view of an embodiment of the disclosure.

A second biaser 86 that is operationally coupled to the drum 66 is powered to selectively effect longitudinal rotation of the drum 66 relative to the deck 52 to direct excess soil selectively to one side or the other of the vehicle 12. The second biaser 86 comprises a second hydraulic motor 96 is and coupled to the deck 52, as shown in FIG. 4. The second biaser 86 may be other biaser type, such as, but not limited to, electric motor type, pneumatic motor type, and the like. The second biaser 86 is gearedly coupled to the beam 70 so that the second biaser 86 is positioned to selectively turn the beam 70 and the drum 66 longitudinally relative to the deck 52.

A controller 88 that is coupled to the frame 14 proximate to the steering unit 42 is operationally coupled to the first biaser 82, the second biaser 86, and the actuator 68. A seat 90 is coupled to the rear section 20 proximate to the steering unit 42 and the controller 88.

In use, pedal controls (not shown) are used to initiate and terminate both forward and rearward movement of the vehicle 12 across the surface while using the steering unit 42 to control a direction of the vehicle 12. The controller 88 allows the user to initiate rotation of the drum 66, to actuate the first biaser 82 to selectively raise, lower, and angle the deck 52 relative to the frame 14 to create flat sections, gentle hills, and mounds in the soil bed, and to actuate the second biaser 86 to rotate the drum 66 longitudinally relative to the deck 52 to direct excess soil selectively to one side or the other of the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A dirt contouring and grading device comprising:
a vehicle comprising a frame, a plurality of wheels, and a propulsion unit such that the vehicle is self-propelled;
a deck engaged to the frame;
a drum engaged to the deck and operationally coupled to an actuator powered for selectively effecting axial rotation of the drum against a surface upon which the vehicle is positioned;
a first biaser engaged to the frame and operationally coupled to the deck, the first biaser being powered for selectively raising, lowering, and angling the deck relative to the frame;
a second biaser operationally coupled to the drum, the second biaser being powered for selectively effecting longitudinal rotation of the drum relative to the deck;
wherein the frame comprises:
a rear section having a rear axle coupled thereto, the rear axle having opposed endpoints, each opposing endpoint having a wheel rotationally coupled thereto; and
a front section coupled to the rear section, the front section comprising:
a first segment coupled to and extending transversely and upwardly from a forward end of the rear section,
a second segment coupled to and extending from the first segment distal from the rear section such that the second segment is substantially parallel to a plane defined by the plurality of wheels,
a third segment coupled to and extending transversely and downwardly from the second segment distal from the first segment,
a crossmember coupled to and extending bilaterally from the second segment proximate to the first segment,
the third segment having a front axle coupled thereto distal from the second segment, the front axle having opposed termini, each opposing terminus having a wheel rotationally coupled thereto, and the front axle being operationally coupled to a steering unit of the vehicle;
the frame comprising a plate coupled to the third segment proximate to the front axle and extending toward the rear section such that the plate is substantially parallel to the plane defined by the plurality of wheels;
the deck comprising a framework having a rear end positioned proximate to the forward end of the rear section of the frame, and a front end pivotally coupled to the plate;
the framework having opposing sides, the opposing sides having a crossbar coupled thereto and extending therebetween;
the actuator comprising a first hydraulic motor;
a beam engaged to the crossbar, the beam having opposed ends, each opposed end having an endplate coupled thereto and extending perpendicularly therefrom;
the drum being rotationally coupled to and extending between the endplates; and
a gearbox engaged to a respective endplate and operationally coupled to the actuator and the drum such that the gearbox is positioned for providing speed and torque conversion between the actuator and the drum.

2. The dirt contouring and grading device of claim 1, wherein the first segment is inverted V-shaped.

3. The dirt contouring and grading device of claim 1, wherein the crossmember is V-shaped.

4. The dirt contouring and grading device of claim 1, further including the frame comprising:
a plate coupled to the third segment proximate to the front axle and extending toward the rear section such that the plate is substantially parallel to the plane defined by the plurality of wheels;
a first brace coupled to and extending between the plate and the third segment; and
a second brace coupled to and extending between the second segment and the third segment.

5. The dirt contouring and grading device of claim 1, further including the opposing sides having a cross support coupled thereto and extending therebetween, the cross support being positioned between the crossbar and the rear end.

6. The dirt contouring and grading device of claim 1, further including a protrusion coupled to and extending from the drum.

7. The dirt contouring and grading device of claim 6, wherein the protrusion is elongated and extending curvedly between opposing limits of the drum.

8. The dirt contouring and grading device of claim 1, wherein the first biaser comprises a first hydraulic cylinder.

9. The dirt contouring and grading device of claim 1, wherein the first biaser is one of a pair of first biasers, each first biaser being pivotally coupled to and extending between a respective opposing limit of the crossmember and an associated opposing side of the framework.

10. The dirt contouring and grading device of claim 1, wherein the second biaser comprises a second hydraulic motor and is coupled to the deck, the second biaser being gearedly coupled to the beam such that the second biaser is positioned for selectively turning the beam and the drum longitudinally relative to the deck.

11. The dirt contouring and grading device of claim 1, further including a controller coupled to the frame proximate to the steering unit, the controller being operationally coupled to the first biaser, the second biaser, and the actuator.

12. The dirt contouring and grading device of claim 1, further including a seat coupled to the rear section proximate to the steering unit and the controller.

13. A dirt contouring and grading device comprising:
a vehicle comprising a frame, a plurality of wheels, and a propulsion unit such that the vehicle is self-propelled, the frame comprising:
a rear section having a rear axle coupled thereto, the rear axle having opposed endpoints, each opposing endpoint having a wheel rotationally coupled thereto, and
a front section coupled to the rear section, the front section comprising:
a first segment coupled to and extending transversely and upwardly from a forward end of the rear section, the first segment being inverted V-shaped,
a second segment coupled to and extending from the first segment distal from the rear section such that the second segment is substantially parallel to a plane defined by the plurality of wheels,
a third segment coupled to and extending transversely and downwardly from the second segment distal from the first segment, a crossmember coupled to and extending bilaterally from the second segment proximate to the first segment, the crossmember being V-shaped,
the third segment having a front axle coupled thereto distal from the second segment, the front axle having opposed termini, each opposing terminus having a wheel rotationally coupled thereto, the front axle being operationally coupled to a steering unit of the vehicle, a plate coupled to the third segment proximate to the front axle and extending toward the rear section such that the plate is substantially parallel to the plane defined by the plurality of wheels, a first brace coupled to and extending between the plate and the third segment, and a second brace coupled to and extending between the second segment and the third segment;

a deck engaged to the frame, the deck comprising a framework having a rear end, positioned proximate to the forward end of the rear section of the frame, and a front end pivotally coupled to the plate, the framework having opposing sides, the opposing sides having a crossbar coupled thereto and extending therebetween, the opposing sides having a cross support coupled thereto and extending therebetween, the cross support being positioned between the crossbar and the rear end;

a drum engaged to the deck and operationally coupled to an actuator powered for selectively effecting axial rotation of the drum against a surface upon which the vehicle is positioned, the actuator comprising a first hydraulic motor;

a beam engaged to the crossbar, the beam having opposed ends, each opposed end having an endplate coupled thereto and extending perpendicularly therefrom, the drum being rotationally coupled to and extending between the endplates;

a protrusion coupled to and extending from the drum, the protrusion being elongated and extending curvedly between opposing limits of the drum;

a gearbox engaged to a respective endplate and operationally coupled to the actuator and the drum such that the gearbox is positioned for providing speed and torque conversion between the actuator and the drum;

a first biaser engaged to the frame and operationally coupled to the deck, the first biaser being powered for selectively raising, lowering, and angling the deck relative to the frame, the first biaser comprising a first hydraulic cylinder, the first biaser being one of a pair of first biasers, each first biaser being pivotally coupled to and extending between a respective opposing limit of the crossmember and an associated opposing side of the framework;

a second biaser operationally coupled to the drum, the second biaser being powered for selectively effecting longitudinal rotation of the drum relative to the deck, the second biaser comprising a second hydraulic motor and being coupled to the deck, the second biaser being gearedly coupled to the beam such that the second biaser is positioned for selectively turning the beam and the drum longitudinally relative to the deck;

a controller coupled to the frame proximate to the steering unit, the controller being operationally coupled to the first biaser, the second biaser, and the actuator; and a seat coupled to the rear section proximate to the steering unit and the controller.

\* \* \* \* \*